United States Patent [19]
Cohen et al.

[11] Patent Number: 6,000,851
[45] Date of Patent: Dec. 14, 1999

[54] ADJUSTABLE ELECTRIC MOTOR BEARING SYSTEM

[75] Inventors: Edward I. Cohen, Annapolis; John G. Purnell, Catonsville, both of Md.

[73] Assignee: The United States of America as represented by the Secretary of the Navy, Washington, D.C.

[21] Appl. No.: 08/988,037

[22] Filed: Dec. 10, 1997

[51] Int. Cl.[6] .................................................. F16C 23/02
[52] U.S. Cl. .......................... 384/252; 384/114; 384/312; 384/626
[58] Field of Search .......................... 384/100, 114, 384/117, 247, 252, 312, 626

[56] References Cited

U.S. PATENT DOCUMENTS

| | | |
|---|---|---|
| 2,293,313 | 8/1942 | Sladky . |
| 3,722,965 | 3/1973 | Gemein et al. .......................... 384/114 |
| 4,643,592 | 2/1987 | Lewis et al. . |
| 4,676,668 | 6/1987 | Ide . |
| 4,714,357 | 12/1987 | Groth et al. .............................. 384/312 |
| 4,765,759 | 8/1988 | Le Breton et al. ...................... 384/252 |
| 5,125,754 | 6/1992 | Ide . |
| 5,142,174 | 8/1992 | Ide . |
| 5,389,411 | 2/1995 | Cohen . |
| 5,743,654 | 4/1998 | Ide et al. ................................. 384/100 |

*Primary Examiner*—Thomas R. Hannon
*Attorney, Agent, or Firm*—John Forrest; Jacob Shuster

[57] ABSTRACT

The parameters of a rotor bearing assembly are readily changed to facilitate evaluation, determination and establishment of optimum bearing clearance and rotor bearing adjustment to minimize noise and vibration, by an arrangement which includes seating of solid deflection pads positioned within a carrier on replaceable adjustment shims and retention of the pads and shims seated in adjusted positions by means of hold-down screws.

6 Claims, 1 Drawing Sheet

ADJUSTABLE ELECTRIC MOTOR BEARING SYSTEM

The invention relates generally to bearing support of rotors and its affect on generation of noise and vibration in response to dynamic forces transmitted during rotor rotation.

BACKGROUND OF THE INVENTION

The provision of a bearing assembly for the rotor of an electric motor or the like is generally well known in the art, including those which feature bearing pads releasably secured to a carrier within which the bearing pads are spaced from each other with predetermined orientations. Utilization of the foregoing types of rotor bearing technology has not been associated with adjustments to minimize generation of noise and vibration under different environmental conditions.

It is therefore an important object of the present invention to provide a rotor bearing system through which noise and vibrations produced by dynamic forces under different environmental conditions may be evaluated and minimized by relatively simple and less costly adjustments.

SUMMARY OF THE INVENTION

In accordance with the present invention, pads of a rotor bearing assembly are adjustably positioned within an annular slot in a carrier from which bearing faces of the pads project toward a rotor surface to establish a bearing clearance. The bearing faces are formed on the larger diameter ends of solid pad bodies seated within the carrier by adjustment shims. Retention screws extend from the carrier through the shims into threaded engagement with the pads within bores formed therein to hold the pads seated in the carrier. The pads are thereby readily adjusted in their seated positions by reassembly to change bearing center and bearing clearance.

BRIEF DESCRIPTION OF DRAWING FIGURES.

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
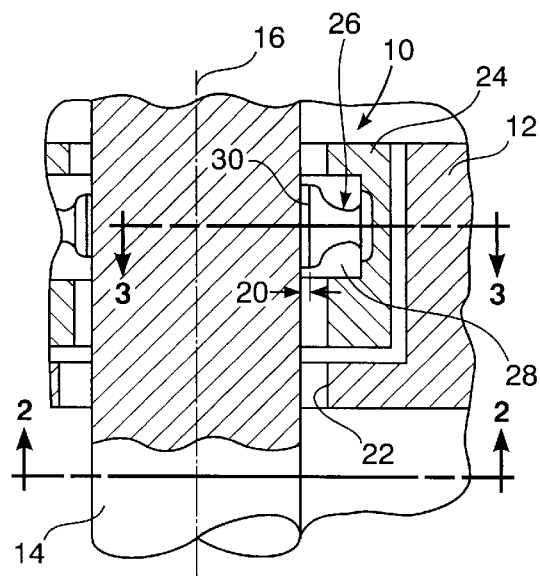
FIG. 1 is a transverse side section view of a bearing assembly installation in accordance with one embodiment of the invention.

Referring now to the drawing in detail, FIG. 1 illustrates a radial bearing assembly 10 of an electric motor as one installational embodiment for the present invention. Such installational embodiment includes a motor stator 12 through which a rotor shaft 14 extends for rotations about an axis 16. The bearing assembly 10 includes an annular carrier member 24 seating therein a plurality of bearing pads 26 positioned in angularly spaced relation to each other about the rotor. Radial clearance 20 is established between the rotor shaft and each bearing pad 26 to form a lubricant filled gap providing hydrodynamic bearing support.

Figure 2:
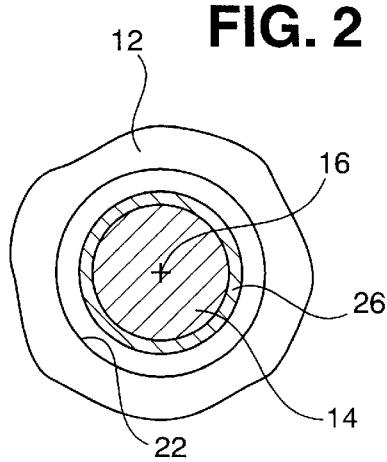
FIG. 2 is a partial section view taken substantially through a plane indicated by section line 2—2 in FIG. 1.

As shown in FIGS. 1 and 2, the carrier member 24 has an annular slot 28 within which the pads 26 are positioned in circumferentially spaced relation to each other. As hereinafter explained, the pads 26 are positioned in radially spaced relation to the rotational axis 16 of the rotor shaft by selectively adjusted amounts as well as being adjustably spaced from each other in a circumferential direction within the annular slot 28 of the carrier member 24 in order to accommodate installational parameters such as rotor bearing position, motor air gap and bearing clearance affecting the translation of dynamic forces into noise and vibration.

Figure 3:
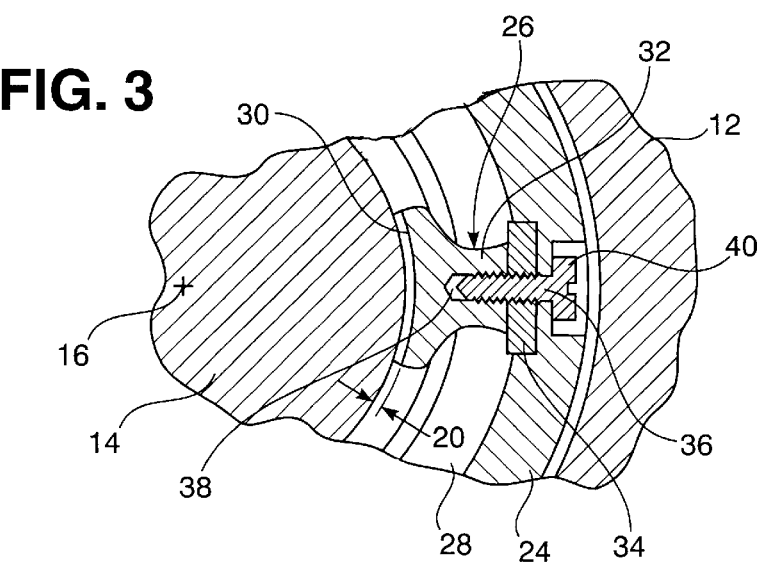
FIG. 3 is a partial section view taken substantially through a plane indicated by section line 3—3 in FIG. 1.

As more clearly seen in FIG. 3, each bearing pad 26 has a bearing face 30 radially spaced along its axis by the gap 20 from the rotor shaft 14. Such face 30 of the pad 26 is formed at one end of a solid spool-like pad body 32, projecting radially by a very small amount from the carrier member 24 toward the rotor shaft. The pad body 32 at its opposite axial end, of smaller diameter, is seated within the carrier slot 28 by a set of adjustment shims 34. Each pad 26 and shim 34 is held assembled within the carrier 24 by a hold-down retention screw 36 threaded into a larger diameter bore 38 formed within the pad body 32. The screw 36 extends from its head 40 through the carrier member 24 and the shim 34 into the bore 38 in the pad body 32. The shims 34 are removed to vary the radial spacing of the pads 26 from the rotor axis 16 and thereby adjust the rotor bearing clearance gap 20 and relative positions of the pads 26 within the bearing assembly. Each screw 36 may be threadedly withdrawn from its bore 38 for either removal or replacement of the shims 34 with ones of a different thickness to thereby vary the bearing adjustment. The pad 26 including its bearing face 30 and pad body 32 as well as each shim 34 may be made of a metal such as brass retained by a screw 36 within the carrier member 24 made of stainless steel for example. Ideally, the pad 26 is made of a spin castable multiphase bearing material, such as a metal matrix composite, ceramic matrix composite and/or a polymer matrix composite to minimize wear over the life cycle of the motor or apparatus with which the bearing assembly is associated.

The foregoing design of the bearing assembly 10 facilitates adjustment of the pad positions through the hold-down screws 36. Any small change in bearing clearance 20 and relative positioning of bearing pads 26 is facilitated by easy removal or replacement of the adjustment shims 34. Such adjustments and changes enables simple and less costly evaluation of rotor bearing dynamic forces and simulated wear for minimizing noise and vibration.

Obviously, other modifications and variations of the present invention may be possible in light of the foregoing teachings. It is therefore to be understood that within the scope of the appended claims the invention may be practiced otherwise than as specifically described.

What is claimed is:

1. In a bearing assembly supporting a rotor for rotation relative to a stator, said bearing assembly including a plurality of pads having axes extending in radial relation to the rotor, a carrier and seating means for mounting the pads within the carrier to establish a bearing clearance between the rotor and the pads along said axes thereof, the improvement residing in said seating means including: adjustment shims respectively positioning the pads within the carrier from which the pads radially project along said axes thereof toward the rotor; and retention means for respectively holding the pads positioned by the shims in selectively adjustable radially spaced relation to the rotor along said axes of the pads, each of the pads comprising: a solid body extending along said axes thereof between opposite axial ends of different diameters, one of said axial ends of larger diameter forming a bearing face radially spaced along said axis by said bearing clearance from the rotor, and said carrier having an annular slot within which the solid bodies of the pads and the adjustment shims are positioned in circumferentially spaced relation to each other about the rotor.

2. The improvement as defined in claim 1 wherein said retention means includes: a bore formed in the solid body of each of the pads and a hold-down screw extending from the carrier and threadedly engaging the solid body within said bore in a radially adjusted position.

3. In a bearing assembly supporting a rotor for rotation relative to a stator, said bearing assembly including a plurality of pads having axes extending in radial relation to the rotor, a carrier and seating means for mounting the pads within the carrier to establish a bearing clearance between the rotor and the pads along said axes thereof, the improvement residing in said seating means including: adjustment shims respectively positioning the pads within the carrier from which the pads radially project along said axes thereof toward the rotor; and retention means for respectively holding the pads positioned by the shims in selectively adjustable radially spaced relation to the rotor along said axes of the pads, comprising: a bore formed in each of the pads and a hold-down screw extending from the carrier into threaded engagement with each of the pads within said bore in radially adjusted positions of pads.

4. In a bearing assembly for rotationally supporting a rotor, said bearing assembly having a carrier and a plurality of pads within the carrier, the improvement residing in: means for adjustably positioning the pads at fixed locations within the carrier to optimize reduction in noise and vibration produced by rotation of the rotor, comprising: adjustment shims respectively seating the pads at said fixed locations within the carrier in circumferentially spaced relation to each other about the rotor; and retention means for respectively holding the pads seated by the shims at said fixed locations within the carrier in adjusted radially spaced relation to the rotor.

5. In a bearing assembly for rotationally sunporting a rotor, said bearing assembly having a carrier and a plurality of pads within the carrier, the improvement residing in: means adjustably positioning the pads at radially adjusted positions within the carrier for optimized reduction in noise and vibration produced by rotation of the rotor, comprising: adjustment shims respectively seating the pads within the carrier; and retention means for respectively holding the pads seated by the shims within the carrier comprising: a bore formed in each of the pads and a hold-down screw extending from the carrier into threaded engagement with each of the pads within said bore in said radially adjusted positions of the pads.

6. The improvement as defined in claim 5 wherein said pads are made of a matrix composite material having wear minimizing properties.

* * * * *